(12) United States Patent
Matsumoto

(10) Patent No.: US 11,070,635 B2
(45) Date of Patent: Jul. 20, 2021

(54) DEVICE MANAGEMENT SERVER AND METHOD

(71) Applicant: CANON KABUSHIKI KAISHA, Tokyo (JP)

(72) Inventor: Tetsuya Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/693,757

(22) Filed: Nov. 25, 2019

(65) Prior Publication Data

US 2020/0177685 A1 Jun. 4, 2020

(30) Foreign Application Priority Data

Nov. 30, 2018 (JP) .............................. JP2018-225483

(51) Int. Cl.
*H04L 29/08* (2006.01)

(52) U.S. Cl.
CPC ........ *H04L 67/16* (2013.01); *H04L 29/08072* (2013.01); *H04L 29/08648* (2013.01); *H04L 67/04* (2013.01); *H04L 67/10* (2013.01); *H04L 67/18* (2013.01); *H04L 67/2838* (2013.01); *H04L 69/329* (2013.01)

(58) Field of Classification Search
CPC ...... H04L 67/00–67/18; H04L 67/2838; H04L 29/08072; H04L 29/08648; H04L 69/329
See application file for complete search history.

(56) References Cited

U.S. PATENT DOCUMENTS

| | | | |
|---|---|---|---|
| 2016/0373542 A1 | 12/2016 | Baba | |
| 2017/0339056 A1* | 11/2017 | Uno | ........................ H04L 45/74 |
| 2020/0076895 A1* | 3/2020 | Tsuyunashi | .......... G07C 5/0866 |

FOREIGN PATENT DOCUMENTS

JP 2017-10227 A 1/2017

* cited by examiner

*Primary Examiner* — Clayton R Williams
(74) *Attorney, Agent, or Firm* — Canon U.S.A., Inc. IP Division

(57) ABSTRACT

After receiving, from at least one service, a plurality of collection requests directed to the same network device, a device management server according to some embodiments selects at least one collection request to be set for the network device on the basis of a specified timing and route. If transmitting a first collection request included in the selected at least one collection request and specifying a predetermined data type reduces a frequency of collection of data of the predetermined data type from the network device, a collection request specifying a timing specified in the first collection request and a lower-cost route is transmitted to the network device.

8 Claims, 6 Drawing Sheets

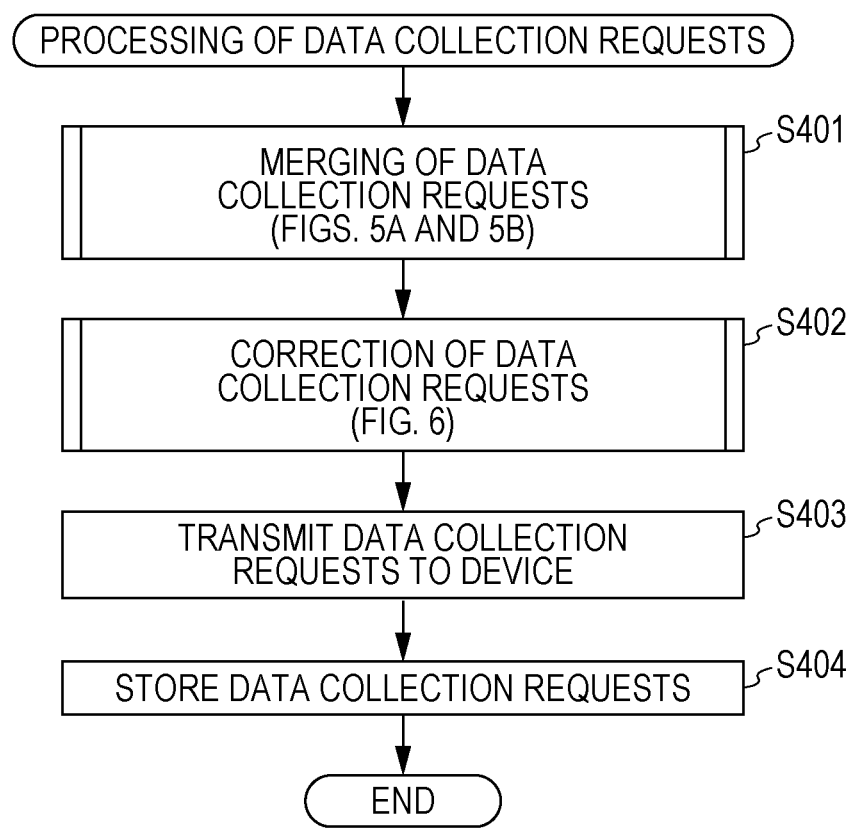

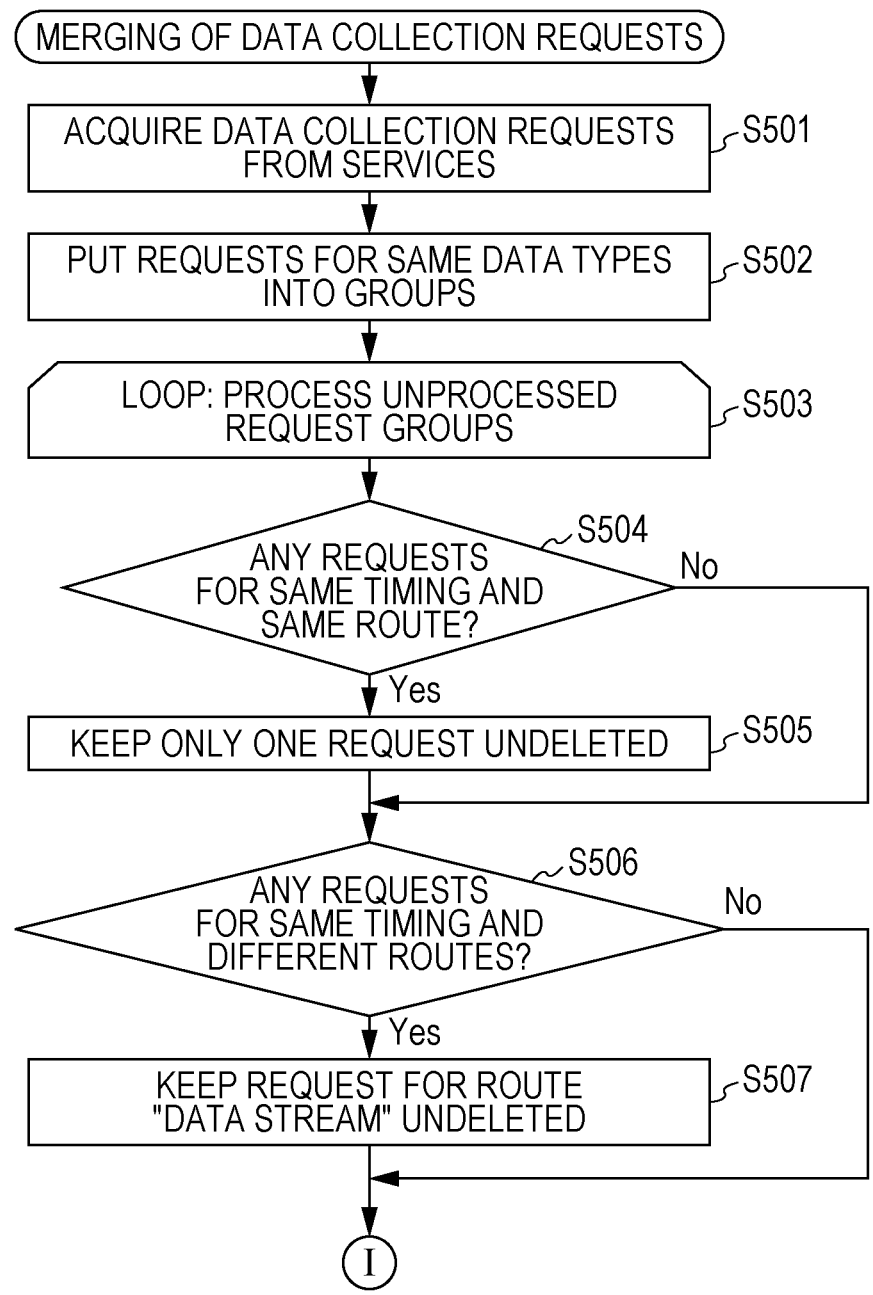

DEVICE MANAGEMENT SERVER AND METHOD

BACKGROUND

Field of the Disclosure

The present disclosure relates to a device management system that manages network devices, such as image forming apparatuses.

Description of the Related Art

There is a device management system for centrally managing network devices (hereinafter also referred to as "devices"), including image forming apparatuses, such as multifunction peripherals, printers, and network cameras, through a network. The device management system has the function of collecting various types of data from the devices being managed, and the function of providing various services to clients by using the collected data. From the devices, each service collects data necessary to provide the service.

There is an information processing system that is built using a cloud infrastructure provided by a cloud vendor. There is also a device management system that operates in conjunction with the information processing system, which accumulates data from devices, to use information from the information processing system (see, e.g., Japanese Patent Laid-Open No. 2017-10227).

Assume an environment where there are provided a plurality of services that operate in conjunction with the information processing system that is built using the cloud infrastructure. In this environment, the plurality of services may need to individually collect necessary data from the devices. In such cases, problems may arise if some of the services individually send data collection requests to the same device.

For example, if one of the services in operation is stopped or cancelled, the service sends a request to an appropriate device to stop collecting data the service has collected. However, other services in operation may still require the data for which the request to stop the collection has been made. That is, it is inconvenient if collection of the data necessary for other services is stopped.

Also, if a plurality of services individually make data collection requests, the requests may result in duplicate transmission of the same data. If such requests are made, unnecessary traffic is generated in the environment where data duplicate management takes place and devices are installed.

SUMMARY

Some embodiments provide a device management server that transmits, to a network device, a collection request specifying a data type, a timing, and a route for collection. The device management server includes a receiving unit configured to receive, from at least one service providing server, a collection request specifying a target device, a data type, a timing, and a route for collection; a selecting unit configured to select, after receiving a plurality of collection requests directed to the same network device, at least one collection request to be set for the network device from the plurality of collection requests on the basis of the timing and the route specified in each of the collection requests; and a transmitting unit configured to transmit the selected at least one collection request to the network device. If transmitting a first collection request included in the selected at least one collection request and specifying a predetermined data type reduces a frequency of collection of data of the predetermined data type requested by a second collection request specifying the predetermined data type and already transmitted to the network device, a collection request specifying the predetermined data type, a timing specified in the first collection request, and a lower-cost route is transmitted to the network device.

Further features of various embodiments will become apparent from the following description of exemplary embodiments with reference to the attached drawings.

BRIEF DESCRIPTION OF THE DRAWINGS

FIG. 4 is a flowchart for explaining how data collection requests are processed in a device management server.

FIGS. 5A and 5B present a flowchart for explaining details of how data collection requests are merged.

DESCRIPTION OF THE EMBODIMENTS

Some embodiments will now be described with reference to the drawings.

First Embodiment (System configuration)

Figure 1:
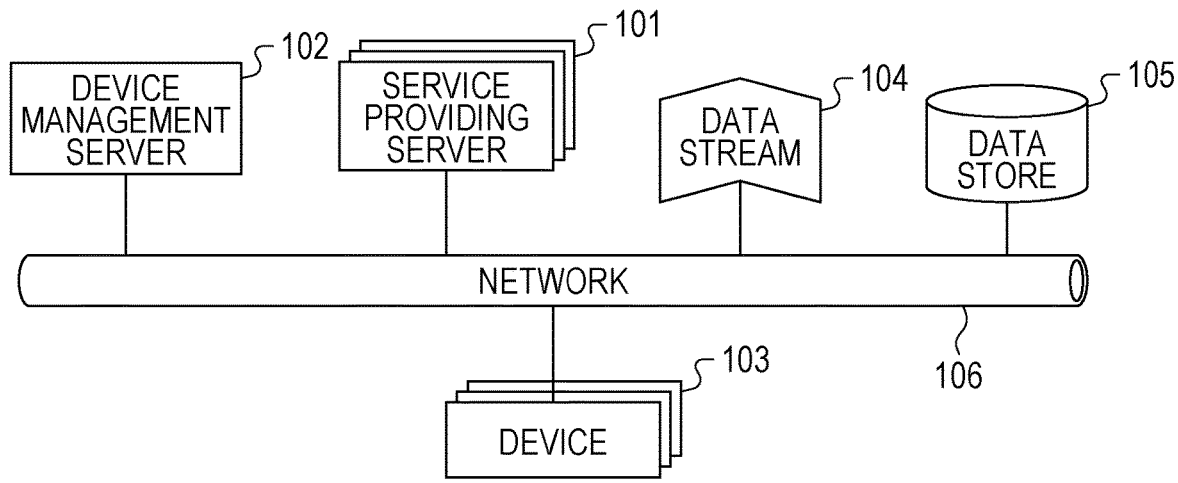
FIG. 1 is a schematic diagram illustrating a configuration of the entire system according to an embodiment.

FIG. 1 is a diagram illustrating a configuration of the entire system according to an embodiment.

Referring to FIG. 1, a plurality of service providing servers 101 provide services to clients by using data collected from devices 103. There may be a plurality of service providing servers 101 corresponding to services, or a plurality of services may be implemented on a single server system. A device management server 102 manages data collection requests from services to the devices 103. Also, the device management server 102 transmits, to the devices 103, data collection requests each defining, for example, the collection timing, the type of data to be collected, and the mode of collection. Examples of the transmission destination specified as the mode of collection include a data stream 104 and a data store 105.

The service providing servers 101 and the device management server 102 are built on a cloud infrastructure and can be implemented on a virtual system composed of at least one computer (information processing apparatus). The data stream 104 and the data store 105 can also be built on the same cloud infrastructure.

The network devices (hereinafter also referred to as "devices") 103 collect various types of data (e.g., use records, statuses, and error information) on the basis of data collection requests received from the service providing servers 101, and transmit the collected data through a network to the outside. A plurality of devices 103 are connected to the system according to this example embodiment. Examples of the devices 103 include image forming apparatuses, such as multifunction peripherals, printers, and network cameras, digital medical devices, home electrical appliances, and digital healthcare devices. The devices 103 discussed in this embodiment are installed in network environments of clients who have signed up for the services provided by the service providing servers 101. The devices 103 are registered in the device management server 102.

The data stream 104 transmits various types of data received from the devices 103 to the service providing servers 101 that require the received data. At the same time, the various types of data received from the devices 103 are stored in the data store 105.

In accordance with requests from the devices 103, the data store 105 stores various types of data collected in the devices 103. The data stored here can be referenced by the services requiring the data and provided by the service providing servers 101. The data store 105 is a storage service server, which is a system that provides a large amount of storage.

The service providing servers 101, the device management server 102, the devices 103, the data stream 104, and the data store 105 are connected through a network 106. The network 106 is a communication network that is implemented for example by any of, or a combination of any of, the following: a local area network (LAN) or wide area network (WAN), such as the Internet, a telephone line, a dedicated digital line, an asynchronous transfer mode (ATM) or frame relay line, a cable television line, and a data broadcasting wireless network.

(Hardware Configuration of Information Processing Apparatus)

Figure 2:
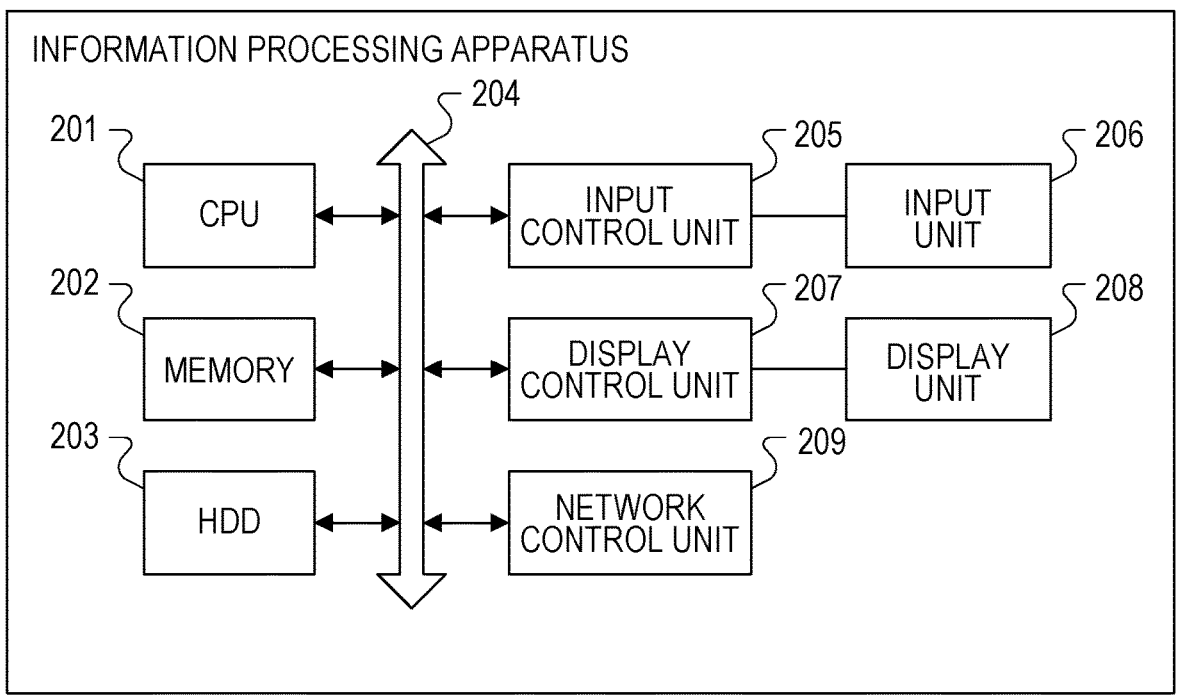
FIG. 2 is a block diagram illustrating a hardware configuration of an information processing apparatus.

FIG. 2 is a block diagram illustrating a hardware configuration of an information processing apparatus that implements the service providing servers 101, the device management server 102, and the devices 103.

The information processing apparatus includes a central processing unit (CPU) 201 that executes software stored in a hard disk drive (HDD) 203 serving as a storage unit. The CPU 201 controls the overall operation of pieces of hardware connected to a system bus 204. A memory 202 serves, for example, as a main memory and a work area for the CPU 201. The HDD 203 serves as a large-capacity storage unit that records data. An input control unit 205 controls input from an input unit 206, such as a keyboard. The input control unit 205 and the input unit 206 may be omitted, as appropriate, depending on the function of the information processing apparatus. A display control unit 207 controls display on a display unit 208, such as a liquid-crystal display. The display control unit 207 and the display unit 208 may be omitted, as appropriate, depending on the function of the information processing apparatus. A network control unit 209 sends and receives data to and from other nodes through a network. The function of each unit illustrated in FIG. 3 (described below) is implemented when the CPU 201 for the unit executes a program for implementing the internal function of the unit.

The information processing apparatus forming the service providing servers 101 and the device management server 102 is implemented by an information processing apparatus provided as a cloud computing service. Examples of the cloud computing include serverless computing and virtual machines. The cloud computing uses a plurality of hardware resources illustrated in FIG. 2. The servers 101 and 102 may each be implemented by a single physical machine.

(Functional Configuration)

Figure 3:
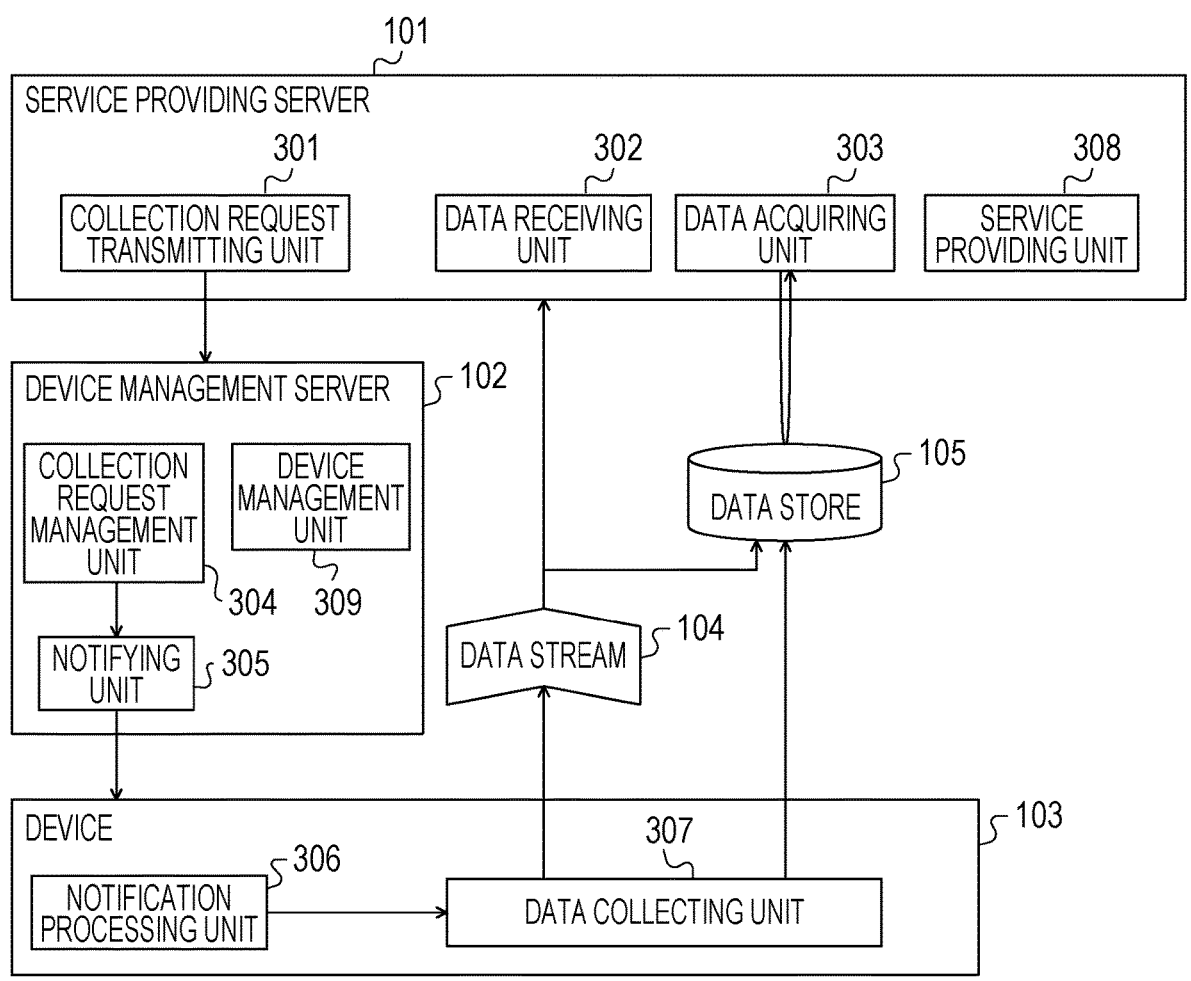
FIG. 3 is a block diagram illustrating a functional configuration of components of the system according to an embodiment.

FIG. 3 is a block diagram illustrating a functional configuration of the service providing server 101, the device management server 102, and the device 103.

The service providing server 101 includes a collection request transmitting unit 301, a data receiving unit 302, a data acquiring unit 303, and a service providing unit 308.

To collect from the device 103 data necessary to provide a service, the collection request transmitting unit 301 generates a data collection request and transmits the generated request to the device management server 102. The data collection request is generated when, for example, a client who owns the device 103 signs up for the service, the client agrees to collect data for the service, and another device 103 to be provided with the service is added. The data collection request may be a request to stop collection of specific data from the device 103. Such a request to stop data collection is generated when, for example, the client stops or cancels the service, the client refuses to collect data, and the device 103 that has been provided with the service is removed.

The data receiving unit 302 receives data from the device 103 through the data stream 104. The data acquiring unit 303 acquires data from the device 103 by sending a request to the data store 105 that stores the data from the device 103 therein. The service providing server 101 may include only one of the data receiving unit 302 and the data acquiring unit 303 depending on the service to be provided. The service providing unit 308 provides a service for which the client has signed up, by using data acquired by at least one of the data receiving unit 302 and the data acquiring unit 303. Examples of the service include an automated consumables delivery service, a device data backup/restore service, a reporting service that provides device operation information, and a reporting service that reports on device users.

The device management server 102 includes a collection request management unit 304, a notifying unit 305, and a device management unit 309. The device management unit 309 manages identification information of the devices 103 managed by the device management server 102, and client information of the clients who own the devices 103. The device 103 that receives the service provided by the service providing server 101 is any of the devices 103 corresponding to the identification information managed by the device management unit 309.

The collection request management unit 304 receives a data collection request transmitted from the collection request transmitting unit 301 and stores the received request. In accordance with an instruction from the collection request management unit 304, the notifying unit 305 transmits the data collection request to the device 103.

The device 103 includes a notification processing unit 306 and a data collecting unit 307. The notification processing unit 306 processes the data collection request received from the notifying unit 305 and transfers the processed request to the data collecting unit 307. The notification processing unit 306 of the device 103 may be configured to regularly acquire a data collection request from the device management server 102. On the basis of the data collection request received, the data collecting unit 307 collects various types of data at specified timings and transmits the collected data to the data stream 104 or data store 105.

Table A is a table for the collection request management unit 304 of the device management server 102 to manage data collection requests from the services on the basis of data collection requests received from the collection request transmitting unit 301.

TABLE A

| Device ID | Service ID | Data | Timing | Route |
|---|---|---|---|---|
| Device001 | ServiceA | DataX | Event occurrence | Data stream |
| Device001 | ServiceA | DataX | Time (0:00) | Data store |
| Device001 | ServiceB | DataX | Event occurrence | Data stream |
| Device001 | ServiceC | DataX | Interval (1 hour) | Data stream |
| Device001 | ServiceD | DataX | Interval (3 hours) | Data stream |
| Device001 | ServiceE | DataX | Interval (3 hours) | Data store |
| Device001 | ServiceF | DataX | Interval (6 hours) | Data store |
| Device001 | ServiceF | DataY | Event occurrence | Data stream |
| Device002 | ServiceA | DataX | Event occurrence | Data stream |
| Device002 | ServiceA | DataX | Time (0:00) | Data store |
| ... | ... | ... | ... | ... |

Table A manages device IDs which are identifiers of the devices 103 to which data collection requests are sent, service IDs which are identifiers of services from which the data collection requests are sent, types of data to be collected, collection timings, and collection routes.

At least three patterns, "event occurrence", "interval", and "time", can be specified as collection timings. "Event occurrence" means that in response to the occurrence of an event related to target data, the device 103 collects and transmits the data. "Interval" means that the device 103 collects and transmits target data at specified time intervals. "Time" means that the device 103 collects and transmits target data at specified times.

The collection route indicates a transmission mode used to transmit data collected by the device 103. Examples of the collection route include "data stream" for transmitting collected data to the data stream 104, and "data store" for storing collected data in the data store 105.

Each service selects "data stream" for data which requires immediacy in data processing and service provision, and selects "data store" for data which does not require immediacy and may be processed asynchronously with data collection. In an information processing system built using a cloud infrastructure, transmitting data to the data stream 104 may be more costly (e.g., processing load, expense) than transmitting data to the data store 105. Each service can determine whether the data is to be transmitted to the data stream 104 or to the data store 105 depending on the characteristics of the service provided. Examples of data less frequently transmitted only to the data store 105 include logs and sensor data used for data analysis not directly related to the operation of clients. On the other hand, the data stream 104 may be used, for example, for operation information, special logs, and trouble information having a significant impact on the operation of clients.

Instead of the device management server 102, another server connected through the network may hold Table A. In this case, Table A can be referenced by the device management server 102.

The collection request management unit 304 merges data collection requests from services for each device 103 and transmits the resulting request through the notifying unit 305 to the device 103. The merging process will be described in detail later on.

Table B is a table held by the collection request management unit 304 to manage data collection requests already transmitted by the notifying unit 305 to the device 103. Table B is an example table that manages data collection requests transmitted to the device 103 with the device ID "Device001" shown in Table A. Instead of the device management server 102, another server connected through the network may hold Table B.

TABLE B

| Device ID | Data | Timing | Route |
|---|---|---|---|
| Device001 | DataX | Event occurrence | Data stream |
| Device001 | DataX | Time (0:00) | Data store |
| Device001 | DataX | Interval (1 hour) | Data stream |
| Device001 | DataY | Event occurrence | Data stream |

(Processing of Data Collection Requests)

FIG. 4 is a flowchart for explaining how data collection requests are processed by some embodiments of the collection request management unit 304 of the device management server 102. The collection request management unit 304 performs this processing after receiving data collection requests from the service providing servers 101 for services and storing the received requests. The procedure represented by the flowchart is stored in a storage unit, either the memory 202 or the HDD 203, and executed by the CPU 201.

In S401, for the device 103 to which data collection requests newly stored are to be sent, the collection request management unit 304 merges a plurality of data collection requests from services. The details of how the data collection requests are merged will be described later on with reference to FIGS. 5A and 5B.

In S402, the collection request management unit 304 corrects the data collection requests merged in S401. The details of how the data collection requests are corrected will be described later on with reference to FIG. 6.

In S403, the collection request management unit 304 transmits the data collection requests corrected in S402 through the notifying unit 305 to the target device 103.

In S404, the collection request management unit 304 stores, in a table, the data collection requests transmitted in S403 and ends the process.

(Merging of Data Collection Requests)

Figure 5B:
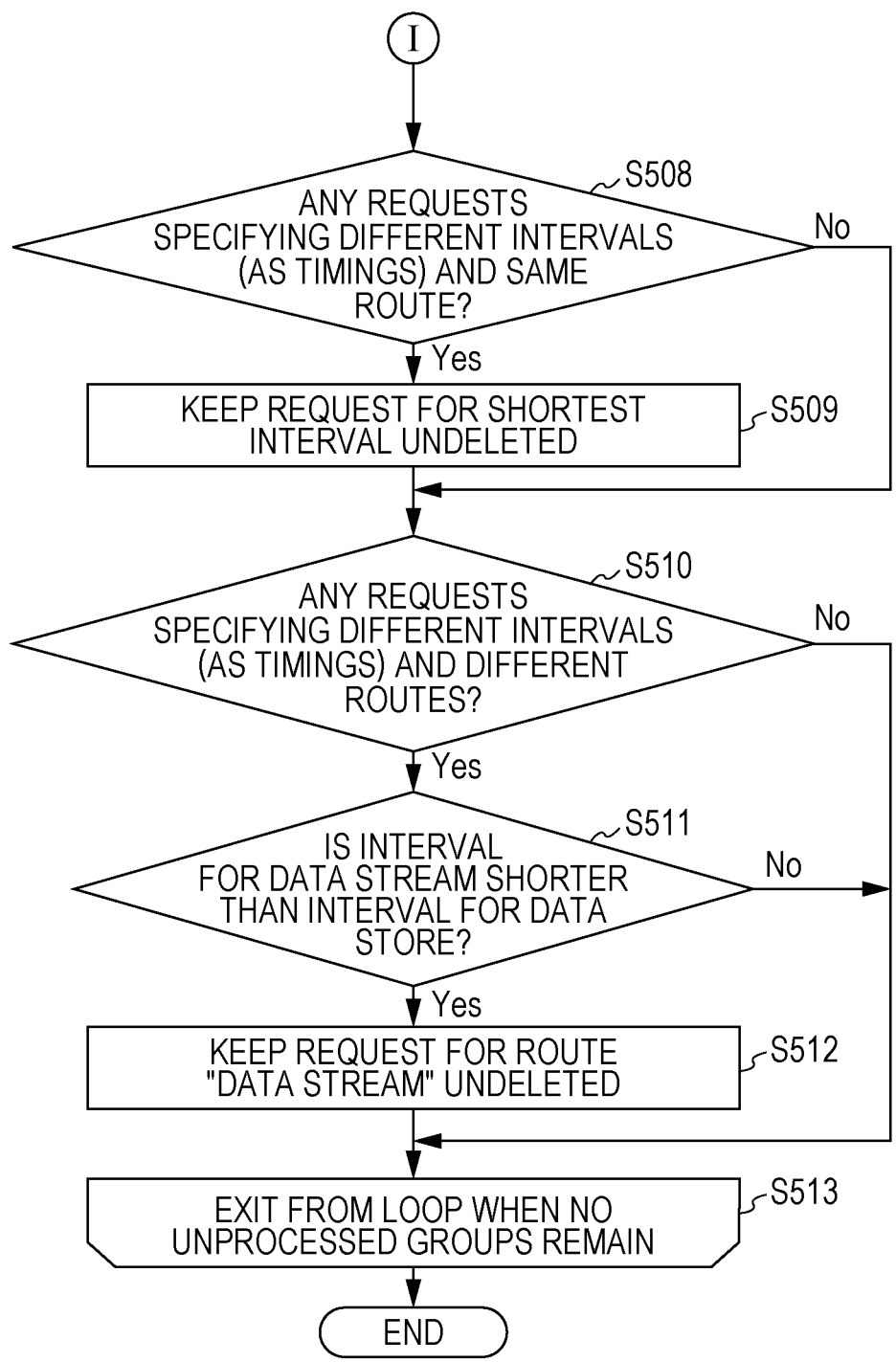

FIGS. 5A and 5B present a flowchart for explaining details of how data collection requests are merged in S401 of FIG. 4.

Merging is performed with respect to the device 103 for which existing data collection settings will be updated in response to a data collection request newly received from each service. Specifically, the merging is performed on the basis of the target data, collection timing, and collection route included in the collection request already stored, and also on the basis of the data collection request newly received. Note that a plurality of data collection requests may be simultaneously transmitted from the service and stored together in the device management server 102.

By this processing, collection of data required by services, other than the service from which the new data collection request has been transmitted, can be prevented from being stopped, and duplicate transmission of the same data can also be prevented. It is thus possible to continue to provide services properly and carried out efficient data collection without causing unnecessary traffic and cost.

In S501, for the device 103 to which newly received data collection requests are to be sent, the collection request management unit 304 acquires data collection requests from services managed in Table A. The collection request management unit 304 stores the acquired data collection requests in a transmission target table and manages them. In S502, for the data collection requests from the services acquired in S501, the collection request management unit 304 puts collection requests for the same data types into groups (hereinafter referred to as "request groups"). In the example of Table A, two request groups can be generated, which are a group including a plurality of data collection requests for "DataX" and a group including a plurality of data collection requests for "DataY".

The collection request management unit 304 executes a loop from S503 to S513 for each of the request groups generated in S502. Upon completion of the loop for all the groups generated, the collection request management unit 304 exits from the loop as shown in S513 and ends the process illustrated in FIGS. 5A and 5B.

In S504, the collection request management unit 304 determines whether, within the request group to be processed, there are any requests for the same timing and the same route. For example, if two data collection requests both specify "event occurrence" as the timing, these two requests are determined to be for the same timing. Also, if two data collection requests both select "interval" and specify the same time interval as the timing, these two requests are determined to be for the same timing. Also, if two data collection requests both select "time" and specify the same time as the timing, these two requests are determined to be for the same timing. If the collection request management unit 304 determines in S504 that there are any requests for the same timing and the same route, the process proceeds to S505. If the collection request management unit 304 determines in S504 that there are no requests for the same timing and the same route, the process proceeds to S506.

In S505, the collection request management unit 304 deletes all but one of the data collection requests for the same timing and the same route included in the transmission target table.

In S506, the collection request management unit 304 determines whether, within the request group to be processed, there are any requests for the same timing and different routes. If the collection request management unit 304 determines in S506 that there are such requests, the process proceeds to S507. If the collection request management unit 304 determines in S506 that there are no such requests, the process proceeds to S508.

In S507, the collection request management unit 304 deletes all the data collection requests for the same timing and different routes included in the transmission target table, except one data collection request that specifies "data stream" as the route. That is, the data collection requests deleted here are ones that specify "data store" as the route.

In S508, the collection request management unit 304 determines whether, within the request group to be processed, there are any requests specifying different intervals (as the timings) and the same route. If the collection request management unit 304 determines in S508 that there are such requests, the process proceeds to S509. If the collection request management unit 304 determines in S508 that there are no such requests, the process proceeds to S510.

In S509, the collection request management unit 304 deletes all the data collection requests specifying the different intervals (as the timings) and the same route included in the transmission target table, except one data collection request that specifies the shortest time interval.

In S510, the collection request management unit 304 determines whether, within the request group to be processed, there are any requests specifying different intervals (as the timings) and different routes. If the collection request management unit 304 determines in S510 that there are such requests, the process proceeds to S511. If the collection request management unit 304 determines in S510 that there are no such requests, the process proceeds to S513.

In S511, the collection request management unit 304 determines, for the data collection requests specifying the different intervals (as the timings) and different routes, whether the time interval specified in the request for the route "data stream" is shorter than the time interval specified in the request for the route "data store". If the collection request management unit 304 determines in S511 that the time interval specified in the data collection request for the route "data stream" is shorter, the process proceeds to S512. If the collection request management unit 304 determines in S511 that the time interval specified in the data collection request for the route "data stream" is longer, the process proceeds to S513.

In S512, the collection request management unit 304 deletes all the data collection requests specifying the different intervals (as the timings) and different routes included in the transmission target table, except one data collection request that specifies "data stream" as the route.

After processing all the request groups, the process returns to that in the flowchart of FIG. 4. When a plurality of data collection requests directed to the same network device 103 are received from a plurality of service providing servers 101, the requests left undeleted under the conditions illustrated in FIGS. 5A and 5B are selected as candidates for the data collection requests to be set for the network device 103, and can be managed in the transmission target table.

(Correction of Data Collection Requests)

Figure 6:
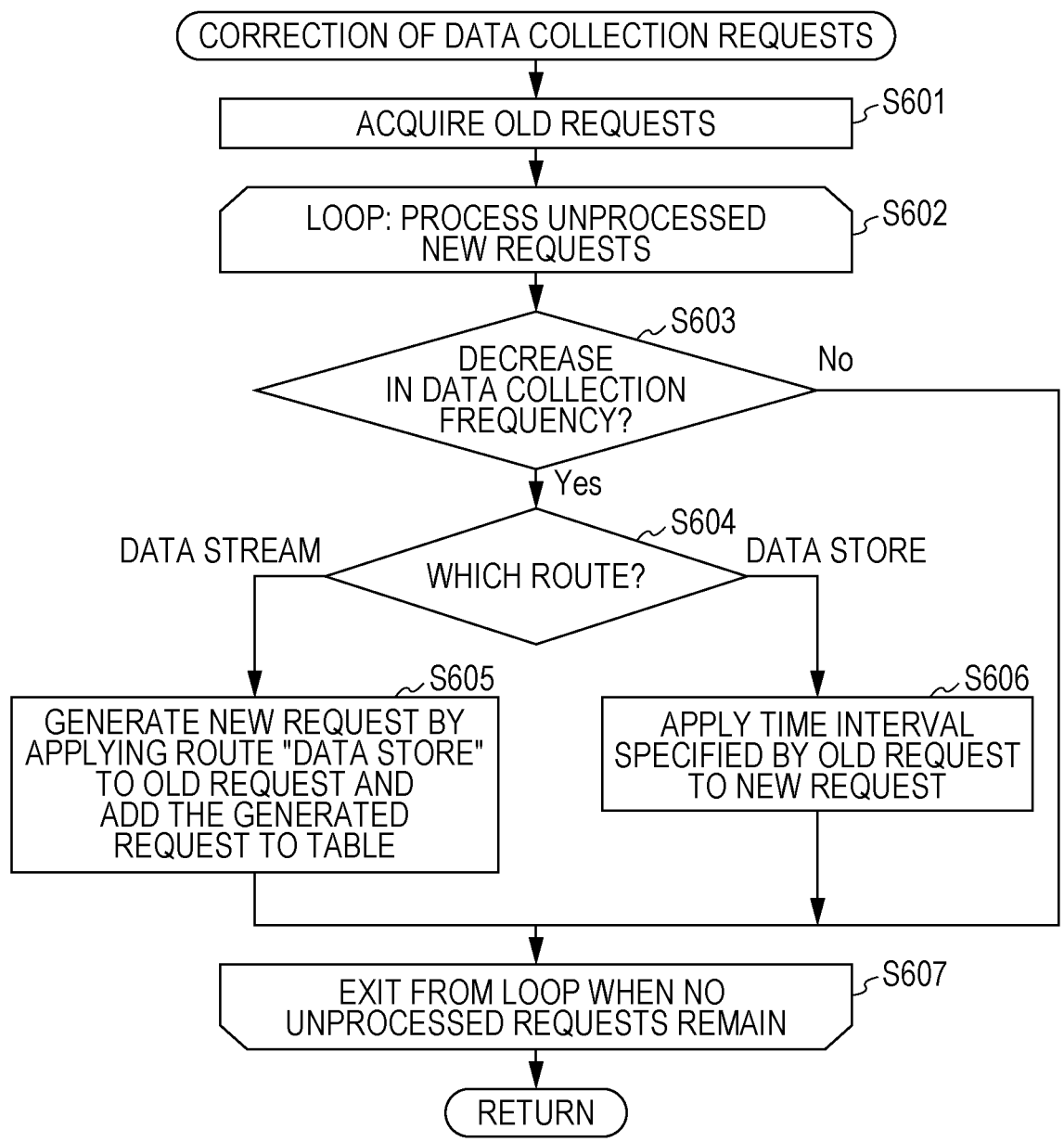
FIG. 6 is a flowchart for explaining details of how merged data collection requests are corrected.

FIG. 6 is a flowchart for explaining details of how data collection requests are corrected in S402 of FIG. 4.

For example, when a service makes a request to stop data collection, the frequency of collection of data of a predetermined data type may decrease. When the frequency of data collection decreases, the accuracy of the service to be provided may decrease. For example, in the case of analyzing and using such collected data, the accuracy of data analysis may decrease and this may slow down the decision-making process using the data.

The process illustrated in FIG. 6 is performed as a solution to this problem. The process involves correcting the transmission target table that includes data collection requests (new requests) merged on the basis of S401 of FIG. 4 or the process illustrated in FIGS. 5A and 5B. Specifically, data collection requests left undeleted in S505, S507, S509, and S512 of FIGS. 5A and 5B are called "new requests" and appropriate processing, such as correction, is performed on the new requests. This maintains the accuracy of data collected from the device 103. A lower-cost collection route is automatically determined and used in maintaining data accuracy.

In S601, the collection request management unit 304 acquires, from Table B, the data collection requests (called "old requests") previously transmitted by the notifying unit 305 to the device 103 subjected to processing in S401.

The collection request management unit 304 executes a loop from S602 to S607 for each of the new requests. Upon completion of the loop for all the new requests, the collection request management unit 304 exits from the loop as shown in S607 and ends the process illustrated in FIG. 6.

In S603, the collection request management unit 304 compares a new request and an old request specifying the same data type and the same route and determines whether the collection frequency decreases. If the time interval specified as the timing of data collection in the new request is longer than the time interval specified in the old request, the collection request management unit 304 determines that the collection frequency decreases. If the collection request management unit 304 determines in S603 that the collection frequency decreases, the process proceeds to S604. If the collection request management unit 304 determines in S603 that the collection frequency increases, the process proceeds to S607.

In S604, the collection request management unit 304 checks the route specified in the new request. If the collection request management unit 304 determines in S604 that the specified route is "data stream", the process proceeds to S605. If the collection request management unit 304 determines in S604 that the specified route is "data store", the process proceeds to S606.

In S605, the collection request management unit 304 automatically generates a new data collection request by applying "data store" as the route for the old request and adds the generated request to the transmission target table.

In S606, the collection request management unit 304 applies the time interval specified as the timing in the old request as the timing for the new request.

Then, if the collection request management unit 304 determines that no unprocessed requests remain, the process returns to that in the flowchart of FIG. 4. Then in S403, the data collection requests included in the transmission target table are transmitted to the device 103.

(Example Application of Process in FIG. 4)

An example will now be described in which, after the data collection requests shown in Table B are transmitted to the device 103, a service with the service ID "ServiceC" shown in Table A makes a request to stop data collection.

When the service with the service ID "ServiceC" makes a request to stop data collection, the data collection request in the fourth record in Table A is deleted. After deletion of this data collection request, the data collection requests from each service to the device 103 with the device ID "Device001" are merged by the process described with reference to FIGS. 5A and 5B.

Table C is a transmission target table obtained after the merging process is performed when the service with the service ID "ServiceC" transmits the data collection request to stop data collection.

TABLE C

| Device ID | Data | Timing | Route |
|---|---|---|---|
| Device001 | DataX | Event occurrence | Data stream |
| Device001 | DataX | Time (0:00) | Data store |
| Device001 | DataX | Interval (3 hours) | Data stream |
| Device001 | DataY | Event occurrence | Data stream |

Table D is a transmission target table obtained after the correction process is performed on Table C as described with reference to FIG. 6.

TABLE D

| Device ID | Data | Timing | Route |
|---|---|---|---|
| Device001 | DataX | Event occurrence | Data stream |
| Device001 | DataX | Time (0:00) | Data store |
| Device001 | DataX | Interval (3 hours) | Data stream |
| Device001 | DataY | Event occurrence | Data stream |
| Device001 | DataX | Interval (1 hour) | Data store |

In Table D, the data collection request in the fifth record is automatically generated and added by the operation in S605 of FIG. 6. This means that data accuracy is maintained by collecting data using "data store", which is a low-cost collection route. For example, the accuracy of data analysis in all services that have analyzed the data, other than ServiceC, is maintained.

Other Embodiments

Some embodiments include an apparatus or system formed by appropriately combining the embodiments described above, and also include a method used in the apparatus or system.

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-225483, which was filed on Nov. 30, 2018 and which is hereby incorporated by reference herein in its entirety.

What is claimed is:

1. A device management server that transmits, to a network device, a collection request specifying a data type, a timing, and a route for collection, the device management server comprising:
  at least one memory storing instructions; and
  at least one processor executing the instructions causing the device management server to:
    receive, from at least one service providing server, a collection request specifying a target device, a data type, a timing, and a route for collection;
    select, after receiving a plurality of collection requests directed to the same network device, at least one collection request to be set for the network device from the plurality of collection requests on the basis of the timing and the route specified in each of the collection requests; and
    transmit the selected at least one collection request to the network device,
  wherein if transmitting a first collection request included in the selected at least one collection request and specifying a predetermined data type reduces a frequency of collection of data of the predetermined data type requested by a second collection request specifying the predetermined data type and already transmitted to the network device, a collection request specifying the predetermined data type, a timing specified in the first collection request, and a lower-cost route is transmitted to the network device.

2. The device management server according to claim 1, wherein if transmitting the first collection request included in the selected at least one collection request and specifying the predetermined data type reduces the frequency of collection of data of the predetermined data type requested by the second collection request specifying the predetermined data type and already transmitted to the network device, the collection request specifying the predetermined data type, the timing specified in the first collection request, and the lower-cost route, instead of the first collection request, is transmitted to the network device.

3. The device management server according to claim 1, wherein if transmitting the first collection request included in the selected at least one collection request and specifying the predetermined data type reduces the frequency of collection of data of the predetermined data type requested by the second collection request specifying the predetermined data type and already transmitted to the network device, the collection request specifying the predetermined data type, the timing specified in the first collection request, and the lower-cost route is transmitted to the network device, in addition to the first collection request.

4. The device management server according to claim 1, wherein one collection request from a plurality of collection requests specifying the same timing and the same route is selected.

5. The device management server according to claim 1, wherein from a plurality of collection requests specifying the same timing and different routes, one collection request specifying a higher-cost route is selected.

6. The device management server according to claim 1, wherein from a plurality of collection requests specifying the same route and different time intervals as timings, one collection request specifying a shortest time interval is selected.

7. A method in a device management server that transmits, to a network device, a collection request specifying a data type, a timing, and a route for collection, the method comprising:

receiving, from at least one service providing server, a collection request specifying a target device, a data type, a timing, and a route for collection;

selecting, after receiving a plurality of collection requests directed to the same network device, at least one collection request to be set for the network device from the plurality of collection requests on the basis of the timing and the route specified in each of the collection requests; and transmitting the selected at least one collection request to the network device, wherein if transmitting a first collection request included in the selected at least one collection request and specifying a predetermined data type reduces a frequency of collection of data of the predetermined data type requested by a second collection request specifying the predetermined data type and already transmitted to the network device, a collection request specifying the predetermined data type, a timing specified in the first collection request, and a lower-cost route is transmitted to the network device.

8. A non-transitory computer-readable storage medium having computer executable instructions stored thereon, wherein the instructions cause a computer as a device management server to:

receive, from at least one service providing server, a collection request specifying a target device, a data type, a timing, and a route for collection;

select, after receiving a plurality of collection requests directed to the same network device, at least one collection request to be set for the network device from the plurality of collection requests on the basis of the timing and the route specified in each of the collection requests; and transmit the selected at least one collection request to the network device, wherein if transmitting a first collection request included in the selected at least one collection request and specifying a predetermined data type reduces a frequency of collection of data of the predetermined data type requested by a second collection request specifying the predetermined data type and already transmitted to the network device, a collection request specifying the predetermined data type, a timing specified in the first collection request, and a lower-cost route is transmitted to the network device.

* * * * *